United States Patent
Wang et al.

(10) Patent No.: US 12,103,118 B2
(45) Date of Patent: Oct. 1, 2024

(54) DUAL-PULSE MIG WELDING POWER SOURCE BASED ON SIC POWER DEVICES

(71) Applicant: South China University of Technology, Guangzhou (CN)

(72) Inventors: Zhenmin Wang, Guangzhou (CN); Qiming Zhong, Guangzhou (CN); Fangxiang Xie, Guangzhou (CN); Wenyan Fan, Guangzhou (CN); Zhuo Luo, Guangzhou (CN)

(73) Assignee: South China University of Technology, Guangzhou (CN)

( * ) Notice: Subject to any disclaimer, the term of this patent is extended or adjusted under 35 U.S.C. 154(b) by 637 days.

(21) Appl. No.: 17/422,262

(22) PCT Filed: Oct. 23, 2019

(86) PCT No.: PCT/CN2019/112885
§ 371 (c)(1),
(2) Date: Jul. 12, 2021

(87) PCT Pub. No.: WO2020/220610
PCT Pub. Date: Nov. 5, 2020

(65) Prior Publication Data
US 2022/0118542 A1    Apr. 21, 2022

(30) Foreign Application Priority Data
Apr. 30, 2019    (CN) .......................... 201910361967.5

(51) Int. Cl.
*B23K 9/09*    (2006.01)
*B23K 9/12*    (2006.01)
(Continued)

(52) U.S. Cl.
CPC .............. *B23K 9/091* (2013.01); *B23K 9/125* (2013.01); *H02M 1/44* (2013.01); *H02M 3/335* (2013.01)

(58) Field of Classification Search
None
See application file for complete search history.

(56) References Cited

U.S. PATENT DOCUMENTS 6,515,259 B1    2/2003  Hsu et al.
2016/0336811 A1*  11/2016  Liu ....................... H02M 7/219
(Continued)

FOREIGN PATENT DOCUMENTS

CN    201201107 Y    3/2009
CN    203171122 U  *  9/2013
(Continued)

OTHER PUBLICATIONS

Machine translation of CN-107745174-A (Year: 2024).*
Machine translation of CN-103658933-A (Year: 2024).*
Machine translation of CN-201317112-U (Year: 2024).*

*Primary Examiner* — Geoffrey S Evans
(74) *Attorney, Agent, or Firm* — The Webb Law Firm (57) ABSTRACT

A dual-pulse MIG welding power source based on SiC power devices may include a main circuit and a digital control circuit. The main circuit may include a power frequency rectifier filter module, a first SiC high frequency inverter module, a first high frequency transformer, and a first SiC fast full-wave rectifier filter module connected sequentially. The power frequency rectifier filter module may be connected to a three-phase AC power supply, and the first SiC fast full-wave rectifier filter module may be connected to a load. The digital control circuit may include a digital human-machine interaction module, a core control module, a SiC high-frequency drive module, a load voltage and current detection feedback module, and a wire feeding
(Continued)

control module. The digital human-machine interaction module may be connected to the core control module.

6 Claims, 5 Drawing Sheets

(51) Int. Cl.
*H02M 1/44* (2007.01)
*H02M 3/33* (2006.01)
*H02M 3/335* (2006.01)

(56) References Cited

U.S. PATENT DOCUMENTS

| | | | |
|---|---|---|---|
| 2018/0345400 A1 | 12/2018 | Wang et al. | |
| 2019/0011512 A1* | 1/2019 | Wang | H03K 17/102 |
| 2019/0173388 A1* | 6/2019 | Suryanarayana | H02M 3/33592 |
| 2022/0152719 A1* | 5/2022 | Wang | H02M 3/33573 |

FOREIGN PATENT DOCUMENTS

| | | | | |
|---|---|---|---|---|
| CN | 103386535 A | | 11/2013 | |
| CN | 102091850 B | | 2/2014 | |
| CN | 103658933 A | * | 3/2014 | ............ B23K 9/092 |
| CN | 106392262 A | | 2/2017 | |
| CN | 106513956 A | | 3/2017 | |
| CN | 206415753 U | | 8/2017 | |
| CN | 107150160 A | | 9/2017 | |
| CN | 107745174 A | * | 3/2018 | ............ B23K 9/073 |
| CN | 106392262 B | | 6/2018 | |
| CN | 108173419 A | | 6/2018 | |
| CN | 110000449 A | | 7/2019 | |
| WO | WO-2007048196 A1 | * | 5/2007 | ............ H02M 7/521 |
| WO | WO-2018032755 A1 | * | 2/2018 | ............ B23K 9/067 |

\* cited by examiner

DUAL-PULSE MIG WELDING POWER SOURCE BASED ON SIC POWER DEVICES

CROSS-REFERENCE TO RELATED APPLICATIONS

This application is the United States national phase of International Application No. PCT/CN2019/112885 filed Oct. 23, 2019, and claims priority to Chinese Patent Application No. 201910361967.5 filed Apr. 30, 2019, the disclosures of each of which are hereby incorporated by reference in their entireties.

BACKGROUND

Field

Non-limiting embodiments or aspects of the present disclosure relate to the technical field of welding equipment, and more specifically to a dual-pulse MIG welding power source based on SiC power devices.

Description of Related Art

Dual-pulse MIG welding technology uses pulse current to control droplet transfer to obtain an ideal droplet transfer form. This technology not only has the characteristics of wide current adjustment range, easy to achieve all-position welding, effective control of heat input, and easy to achieve automation, but also the arc force generated by the change of the average current has a stirring effect on the molten pool, which may reduce the rate of porosity, and refine the grains. It is widely used in high-efficiency automated welding industrial occasions. A dual-pulse MIG welding power source may be the core device of a pulsed MIG welding system. Its comprehensive performance directly affects the actual welding process effect, welding system equipment integration, production energy consumption, cost, etc.

A dual-pulse MIG welding power source generally uses Si-based power devices. Due to inherent limitations of Si-based power devices, a dual-pulse MIG welding power source based on Si-based power devices still has many shortcomings. Specifically, a current dual-pulse MIG welding power source mainly has the following problems:
(1) It is difficult to balance high power and high inverter frequency;
(2) The energy control accuracy is not sufficiently precise; and
(3) The energy density needs to be further improved.

For example, the Chinese invention patent "Aluminum Alloy Digital Welding Machine with Smooth Transition Dual Pulse Parameters" (Publication No.: 102091850B) uses Si IGBT as a switching device. Due to the relatively slow switching speed of a Si IGBT, there is a tail current in the turn-off process. If the inverter frequency is directly increased significantly, the switching loss becomes unacceptable, so the inverter frequency is generally 20 kHz. The inverter welding power source provides energy output control through the on and off of a high frequency regulation power device. Because a dual-pulse MIG welding power source based on Si IGBT is limited by switching loss, the inverter frequency is difficult to increase, the time constant of the main circuit is relatively large, and the energy control cycle is long and relatively extensive.

For example, Chinese utility model patent "MOSFET Inverter Argon Arc Welding Machine" (Publication No.: 201201107Y) uses Si MOSFET as a switching device, which may increase the inverter frequency to several times that of an IGBT welding machine. Due to the low voltage resistance of Si MOSFET, the current capacity is small, the maximum output current of the welding machine is only 160 A, and the rated power is 3.2 kW, which may not meet the needs of high-power welding occasions.

Another example is the NB-400 gas metal welding machine produced by Beijing Shidai, which uses Si IGBT as the switching device. The rated current is 400 A, the power supply efficiency is 85%, and the power supply weight is 41 kg. The energy consumption is relatively high, and the heat dissipation conditions are strict. The volume of the heat sink complicates the design of the heat dissipation scale, which is not conducive to the miniaturization and light weight of the welding machine, so there is a deficiency in energy density.

SUMMARY

In order to overcome the shortcomings and deficiencies of existing technology, an object of non-limiting embodiments or aspects of the present disclosure is to provide a dual-pulse MIG welding power source, based on wide bandgap SiC power devices, which may take each of high power and high inverter frequency into consideration, and is beneficial to realize refined energy control, low energy consumption, high efficiency, and high energy density.

In order to achieve the above object, non-limiting embodiments or aspects of the present disclosure provide a dual-pulse MIG welding power source based on SiC power devices comprising a main circuit and a digital control circuit; the main circuit comprises a power frequency rectifier filter module, a first SiC high frequency inverter module, a first high frequency transformer, and a first SiC fast full-wave rectifier filter module connected sequentially; wherein the power frequency rectifier filter module is connected to a three-phase AC power supply, and the first SiC fast full-wave rectifier filter module is connected to a load; the digital control circuit comprises a digital human-machine interaction module, a core control module, a SiC high-frequency drive module, a load voltage and current detection feedback module, and a wire feeding control module; the digital human-machine interaction module is connected to the core control module; one end of the SiC high-frequency drive module is connected to a PWM output of the core control module, another end is connected to the first SiC high frequency inverter module; one end of the load voltage and current detection feedback module is connected to the load, and another end is connected to an A/D conversion end of the core control module; one end of the wire feeding control module is connected to the core control module, and another end is connected to a wire feeder DC motor.

In some non-limiting embodiments or aspects, the first SiC high frequency inverter module comprises a SiC power switch transistor Q1, a SiC power switch transistor Q2, a SiC power switch transistor Q3 and a SiC power switch transistor Q4; the SiC power switch transistor Q1, the SiC power switch transistor Q2, the SiC power switch transistor Q3 and the SiC power switch transistor Q4 are respectively connected in parallel with a first RC absorption circuit; the SiC power switch transistor Q1, the SiC power switch transistor Q2, the SiC power switch transistor Q3 and the SiC power switch transistor Q4 form a full-bridge inverter circuit, and the full-bridge inverter circuit is connected to a primary of the first high frequency transformer through a blocking capacitor $C_b$;

the first SiC fast full-wave rectifier filter module comprises a SiC Schottky diode group DR1 and a SiC Schottky diode group DR2; a first secondary output terminal of the first high frequency transformer is connected to a third secondary output terminal of the first high frequency transformer through the SiC Schottky diode group DR1 and the SiC Schottky diode group DR2 connected sequentially; a connection point between the SiC Schottky diode group DR1 and the SiC Schottky diode group DR2 is connected to one end of the load, and a second secondary output terminal of the first high frequency transformer is connected to another end of the load through an output filter reactance Lr.

In some non-limiting embodiments or aspects, the SiC Schottky diode group DR1 and the SiC Schottky diode group DR2 are both formed by three SiC Schottky diodes and a second RC absorption circuit connected in parallel.

In some non-limiting embodiments or aspects, the main circuit further comprises a second SiC high frequency inverter module, a second high frequency transformer, and a second SiC fast full-wave rectifier filter module; wherein the second SiC high frequency inverter module is connected to the power frequency rectifier filter module, the second SiC fast full-wave rectifier filter module is connected with the load; another end of the SiC high frequency drive module is also connected with the second SiC high frequency inverter module; a topology of the second SiC high frequency inverter module is the same as that of the first SiC high frequency inverter module; a topology of the second high frequency transformer is the same as that of the first high frequency transformer; a topology of the second SiC fast full-wave rectifier filter module is the same as that of the first SiC fast full-wave rectifier filter module.

In some non-limiting embodiments or aspects, the wire feeding control module comprises: a wire feeding control chip, a CAN communication circuit, an H-bridge drive circuit and a DC motor voltage feedback circuit; the wire feeding control chip is signally connected to the core control module through the CAN communication circuit to realize a communication between the wire feeding control chip and the core control module; the wire feeding control chip is connected to the wire feeder DC motor through the H-bridge drive circuit to drive the wire feeder DC motor to operate; the DC motor voltage feedback circuit is configured and/or used to detect a voltage of the wire feeder DC motor in real time; the DC motor voltage feedback circuit is connected with the wire feeding control chip to realize a closed loop control of the wire feeder DC motor.

Compared with conventional multi-functional welding power sources, non-limiting embodiments or aspects of the present disclosure improve and/or optimize the design of the wire feeding control system around dual-pulse welding. For example, in the Chinese invention patent "DSC-based full digital SiC inverter multi-functional argon arc welding power source" (Publication No.: 106392262B), although the SiC power device is used to develop the welding power source, the improved or optimized development of the wire feeding control is not carried out for the dual-pulse MIG welding; non-limiting embodiments or aspects of the present disclosure adopt a H-bridge drive mode to realize a stepless speed regulation of the wire feeding and realize a forward rotation, a reverse rotation, a pulsation and other operating methods; making full use of CAN communication circuit to carry out a coordinated control of wire feeding and welding power source, a dual-pulse MIG welding may be realized through "a single pulse+pulse wire feeding" or "low frequency modulation+constant speed wire feeding".

In some non-limiting embodiments or aspects, the H-bridge drive circuit comprises a switching transistor Qf1, a switching transistor Qf2, a switching transistor Qf3, a switching transistor Qf4, a braking resistor BRK1, and a relay JD1; the switching transistor Qf1, the switching transistor Qf2, the switching transistor Qf3, and the switching transistor Qf4 form an H-bridge topology; an output end of the H-bridge topology is connected to the wire feeder DC motor; the braking resistor BRK1 and the relay JD1 are connected in series, and the braking resistor BRK1 and the relay JD1 that are connected in series are connected in parallel to the output of the H-bridge topology.

In some non-limiting embodiments or aspects, the core control module may include to a high-speed DSC core control module.

Compared with existing technology, non-limiting embodiments or aspects of the present disclosure have at least the following advantages and beneficial effects:

1. Each of higher power and higher inverter frequency: Non-limiting embodiments or aspects of the present disclosure apply SiC power devices with the advantages of higher withstand voltage, lower loss, faster switching speed, etc. to the power conversion main circuit of a dual-pulse MIG welding power source, which may stably achieve 400 A level 200 kHz ultra high frequency inversion. The inverter frequency is increased to more than 5 times of the existing Si IGBT welding power source. The rated output power of the power source is much higher than the existing Si MOSFET welding power source, which may meet the application needs of high-power welding occasions;

2. Refined dual-pulse MIG welding energy control: The inverter frequency of the dual-pulse MIG welding power source of Non-limiting embodiments or aspects of the present disclosure may be as high as 200 kHz, which broadens the output pulse frequency range, and has stronger electric arc energy adjustment capabilities, and may realize fine control of the output current, to better match with variable speed pulsation wire feeding or realize low frequency modulation, which is more conducive to the processing potential of dual-pulse welding; in addition, by adjusting the output signal of a SiC high frequency drive module, constant current, constant pressure, single pulse gas shielded welding and other processes may also be realized;

3. Lower energy consumption, higher efficiency, and higher energy density: Non-limiting embodiments or aspects of the present disclosure adopt full SiC power devices, which have the characteristics of low on-resistance and high switching speed, so that conduction loss and switching loss are reduced, and the energy efficiency may be higher than 92%; realizing the miniaturization and lighter weight of the welding machine, and improving the energy density;

4. The main circuit may adopt a dual-loop parallel structure, which may further increase the output power, thereby ensuring a sufficient margin;

5. Non-limiting embodiments or aspects of the present disclosure adopt a H-bridge drive mode to realize a stepless speed regulation of the wire feeding and realize a forward rotation, a reverse rotation, a pulsation, and other operating methods; making full use of CAN communication circuit to carry out a coordinated control of wire feeding and welding power source, a dual-pulse MIG welding may be realized through "a single pulse+pulse wire feeding" or "low frequency modulation+constant speed wire feeding", which realizes wire feeding control improvement or optimization for a dual-pulse MIG welding; not only may it realize the refined control of energy to better match a pulsating wire feeding, but also broaden an effective setting range of low-frequency modulation parameters.

DETAILED DESCRIPTION

Non-limiting embodiments or aspects of the present disclosure are further described in detail below with reference to the figures and specific embodiments.

A dual-pulse MIG welding power source based on SiC power devices may have a structure as shown in FIGS. 1 to 6 and may comprise a main circuit and a digital control circuit.

Figure 1:
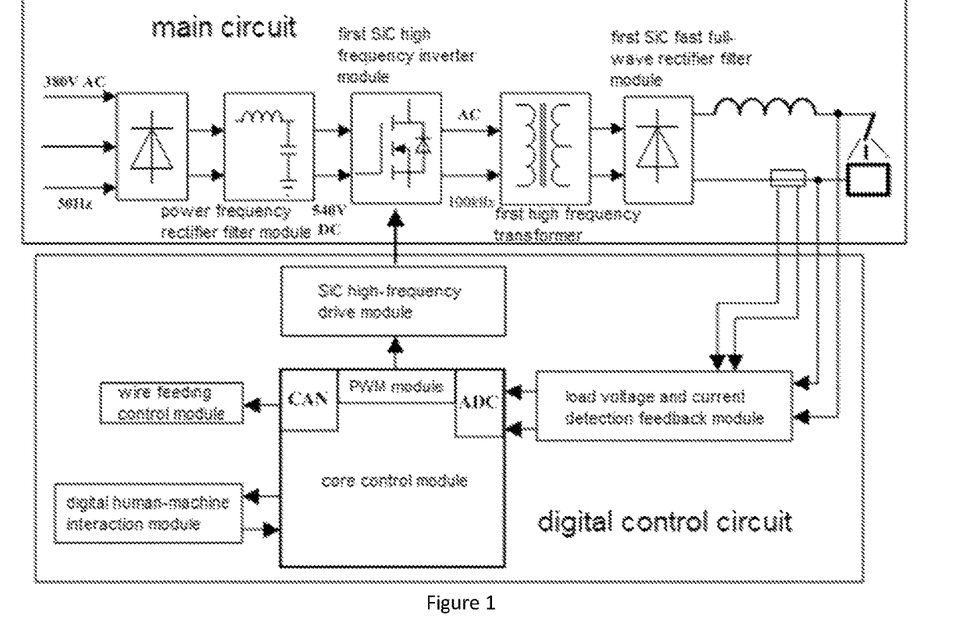
FIG. 1 is an illustrative diagram of non-limiting embodiments or aspects of an overall framework of a dual-pulse MIG welding power source based on SiC power devices.

As shown in FIG. 1, the main circuit comprises a power frequency rectifier filter module, a first SiC high frequency inverter module, a first high frequency transformer, and a first SiC fast full-wave rectifier filter module connected sequentially; wherein the power frequency rectifier filter module is connected to a three-phase AC power supply, and the first SiC fast full-wave rectifier filter module is connected to a load.

Figure 2:
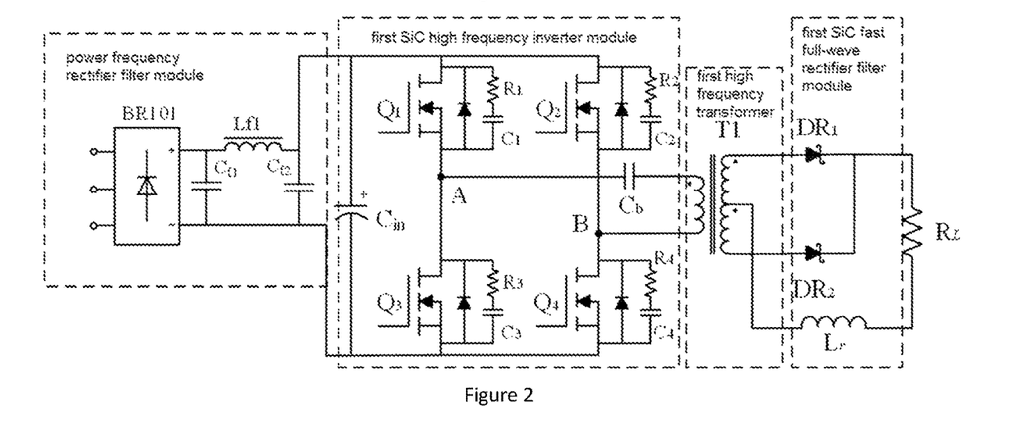
FIG. 2 is a circuit diagram of non-limiting embodiments or aspects of a main circuit of a dual-pulse MIG welding power source based on SiC power devices.

As shown in FIG. 2, the first SiC high frequency inverter module comprises a SiC power switch transistor Q1, a SiC power switch transistor Q2, a SiC power switch transistor Q3, and a SiC power switch transistor Q4; the SiC power switch transistor Q1, the SiC power switch transistor Q2, the SiC power switch transistor Q3, and the SiC power switch transistor Q4 are respectively connected in parallel with a first RC absorption circuit; the SiC power switch transistor Q1, the SiC power switch transistor Q2, the SiC power switch transistor Q3, and the SiC power switch transistor Q4 form a full-bridge inverter circuit, and the full-bridge inverter circuit is connected to a primary of the first high frequency transformer through a blocking capacitor $C_b$, in order to reduce or prevent a magnetic saturation. Due to a good performance of the parasitic diode and fast reverse recovery of the SiC power switch transistors, the parasitic diode and the SiC power switch transistors may be directly used for freewheeling without the need for an additional reverse parallel freewheeling diode, which simplifies the circuit structure.

The first SiC fast full-wave rectifier filter module comprises a SiC Schottky diode group DR1 and a SiC Schottky diode group DR2; a first secondary output terminal of the first high frequency transformer is connected to a third secondary output terminal of the first high frequency transformer through the SiC Schottky diode group DR1 and the SiC Schottky diode group DR2 connected sequentially; a connection point between the SiC Schottky diode group DR1 and the SiC Schottky diode group DR2 is connected to one end of the load, and a second secondary output terminal of the first high frequency transformer is connected to another end of the load through an output filter reactance Lr.

The SiC Schottky diode group DR1 and the SiC Schottky diode group DR2 may each be formed by three SiC Schottky diodes and a second RC absorption circuit connected in parallel.

The digital control circuit comprises a digital human-machine interaction module, a core control module, a SiC high-frequency drive module, a load voltage and current detection feedback module, and a wire feeding control module; the digital human-machine interaction module is connected to the core control module; one end of the SiC high-frequency drive module is connected to a PWM output of the core control module, another end is connected to the first SiC high frequency inverter module; one end of the load voltage and current detection feedback module is connected to the load, and another end is connected to an A/D conversion end of the core control module; one end of the wire feeding control module is connected to the core control module, and another end is connected to a wire feeder DC motor.

Non-limiting embodiments or aspects of the present disclosure apply SiC power devices with the advantages of high withstand voltage, low loss, fast switching speed, etc. to the power conversion main circuit of a dual-pulse MIG welding power source, which may stably achieve 400 A level 200 kHz ultra high frequency inversion. The inverter frequency is increased to more than 5 times of the existing Si IGBT welding power source. The rated output power of the power source is much higher than the existing Si MOSFET welding power source, which may meet the application needs of high-power welding occasions.

The inverter frequency of the dual-pulse MIG welding power source of non-limiting embodiments or aspects of the present disclosure may be as high as 200 kHz, which broadens the output pulse frequency range, and has stronger electric arc energy adjustment capabilities, and may realize fine control of the output current, to better match with variable speed pulsation wire feeding or realize low frequency modulation, with great processing potential.

Non-limiting embodiments or aspects of the present disclosure may adopt full SiC power devices, which have the characteristics of low on-resistance and high switching speed, so that conduction loss and switching loss are reduced, and the energy efficiency may be higher than 92%

The core control module may include to a high-speed DSC core control module.

The digital control circuit adopts a three-core structure, and the digital human-machine interaction module, the high-speed DSC core control module and the wire feeding control module are each controlled by an independently operating control chip. For example, the high-speed DSC core control module may be a control chip of STM32F405RGT6; the digital human-machine interaction module realizes the human-machine interaction functions such as welding parameter setting and display, and uses bus communication with the high-speed DSC core control module to achieve coordinated control; The high-speed DSC core control module mainly completes tasks such as welding process task control, PWM signal generation, output waveform modulation, and closed-loop control algorithm etc.

The high-speed DSC core control module controls the progress of the process tasks by monitoring each switch signals and welding process identifiers; the high-speed DSC core control module completes the welding current value, voltage value of the A/D conversion through the load voltage and current detection feedback module, and compared with the parameters set by a user, and by calculating through the closed-loop control algorithm, constantly changing the PWM signal pulse width to stabilize the actual output at the set parameters. The high-speed DSC core control module generates four PWM signals from different channels of the same timer through the center-aligned mode, corresponding to the driving signals of the high-frequency inverter module of the two parallel circuits of the main circuit; the high-speed DSC core control module uses the timer according to a certain rule to switch the welding parameters regularly to realize the modulation of the output waveform of the welding power source.

The SiC high-frequency drive module may use an existing technology, for example, the SiC high-frequency drive module disclosed in detail in the Chinese invention patent application "A High-Efficiency Drive Circuit Suitable for Wide Bandgap Power Devices" (Publication No.: 108173419A). The SiC high-frequency drive module has the function of isolating the PWM signal of the high-speed DSC core control module, amplifying and forming a specific drive waveform of the SiC power switch transistor, and also has functions such as desaturation and protection etc. The specific circuit structure comprises a three-terminal regulator and an isolated DC/DC power supply module, a drive integrated chip, a high-speed switching diode; different drive integrated chips may use different isolation methods such as transformer isolation, magnetic isolation, optocoupler isolation, capacitive isolation, etc. to isolate the PWM input and drive output from the high-speed DSC core control module. The isolated DC/DC power supply module and the three-terminal regulator form the power supply part of the SiC high-frequency drive module for driving the integrated chip to isolate the input and output ends of the power supply to ensure that the two ends are electrically isolated reliably. The anode of the high-speed switching diode is connected to the desaturation detection pin of the driving integrated chip, and the cathode is connected to the drain of the SiC power switch transistor. The built-in power supply for driving the integrated chip forms a loop through the desaturation detection pin, diode and SiC power switch transistor. When the SiC power switch transistor passes a large current or a short circuit occurs, the voltage detected by the desaturation detection pin exceeds the desaturation determination value, and the chip deals with the detected desaturation immediately and turns off the drive output to realize the protection of power devices and even the welding power system.

The load voltage and current detection feedback module may use existing technology, for example, the load electrical signal detection module disclosed in detail in the Chinese invention patent "DSC-Based Full Digital SiC Inverter Multi-functional Argon Arc Welding Power Source" (Publication No.: 106392262B)), as well as U.S. Patent Application Publication No. US20180345400A1. The load voltage and current detection feedback module specifically comprises a Hall sensor and a voltage follower; the Hall sensor performs a non-contact measurement of the load voltage/current, and convert the actual load voltage/current to the corresponding voltage value output within the measurement range. The output of the voltage follower is connected to the input of the voltage follower. The voltage follower has the characteristics of high input impedance and low output impedance, which may provide the effect of further buffer and isolation. The output of the voltage follower and the A/D conversion module of the high-speed DSC core control module is connected to form a welding voltage/current feedback loop.

Figure 3:
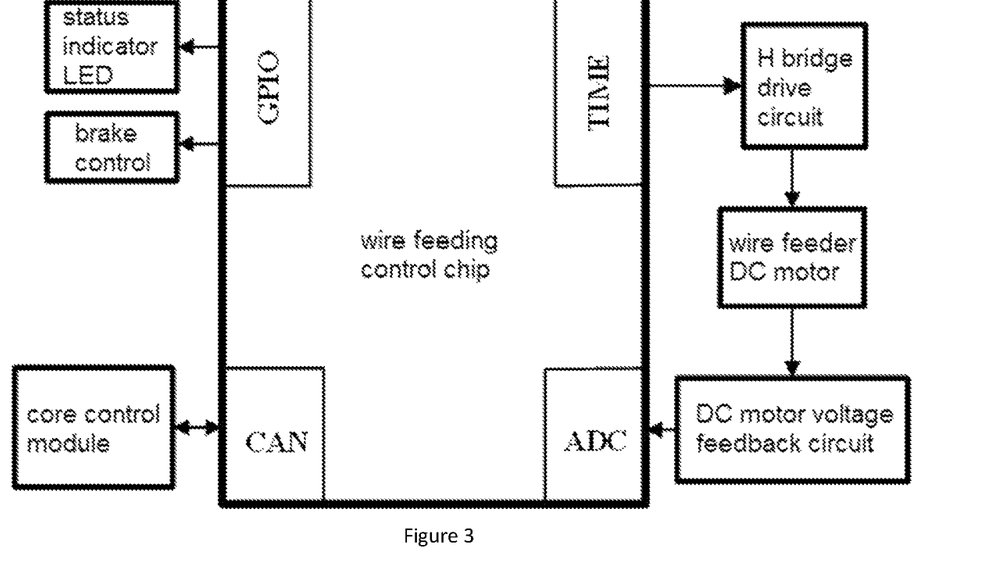
FIG. 3 is an illustrative diagram of non-limiting embodiments or aspects of a wire feeding control module of a digital control circuit in a dual-pulse MIG welding power source based on SiC power devices.

As shown in FIG. 3, the wire feeding control module comprises a wire feeding control chip, a CAN communication circuit, an H-bridge drive circuit, and a DC motor voltage feedback circuit.

The wire feeding control chip is signally connected to the core control module through the CAN communication circuit to realize a communication between the wire feeding control chip and the core control module; the wire feeding control chip is connected to the wire feeder DC motor through the H-bridge drive circuit to drive the wire feeder DC motor to operate; the DC motor voltage feedback circuit is used to detect a voltage of the wire feeder DC motor in real time; the DC motor voltage feedback circuit is connected with the wire feeding control chip to realize a closed loop control of the wire feeder DC motor. The DC motor voltage feedback circuit may use existing technology, for example, the load electrical signal detection module disclosed in detail in the Chinese invention patent "DSC-Based Full Digital SiC Inverter Multi-functional Argon Arc Welding Power Source" (Publication No.: 106392262B), as well as U.S. Patent Application Publication No. US20180345400A1

Figure 4:
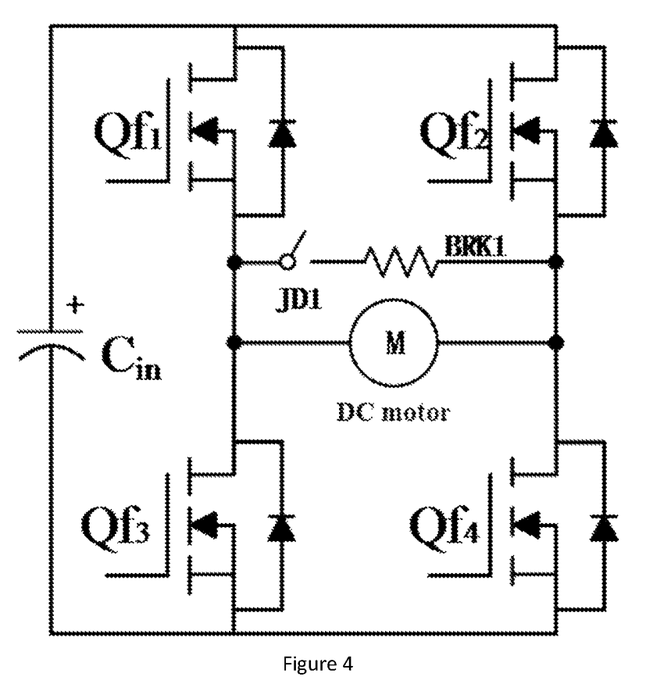
FIG. 4 is an illustrative diagram of non-limiting embodiments or aspects of a H-bridge driving circuit in a dual-pulse MIG welding power source based on SiC power devices.

In some non-limiting embodiments or aspects, the H-bridge drive circuit comprises a switching transistor Qf1, a switching transistor Qf2, a switching transistor Qf3, a switching transistor Qf4, a braking resistor BRK1, and a relay JD1; the switching transistor Qf1, the switching transistor Qf2, the switching transistor Qf3, and the switching transistor Qf4 form an H-bridge topology; an output end of the H-bridge topology is connected to the wire feeder DC motor; the braking resistor BRK1 and the relay JD1 are connected in series, and the braking resistor BRK1 and the relay JD1 that are connected in series are connected in parallel to the output of the H-bridge topology. The left half bridge is used to control the speed of the wire feeder DC motor, the right half bridge is used to switch the rotating direction of the wire feeder DC motor; one end of the DC motor voltage feedback circuit is connected to the wire feeder DC motor, and the other end is connected to the A/D conversion module of the wire feeding control chip; the basic operating principle of the wire feeding control module is: the wire feeding control chip and the high-speed DSC core control module realize fast and stable data transmission through the CAN communication circuit, and obtain the setting parameters of the wire feeding speed comprising steering and rotation speed; The switching transistor Qf2 is turned off, the switching transistor Qf4 is turned on, and the duty cycle of the PWM signal driving the switching transistor Qf1 is much greater than that of the switching transistor Qf3, and the reverse rotation is with the same concept; when the wire feeder brake is controlled, turn off the PWM signal that drives the above four switch transistors, at the same time relay JD1 is closed. The regenerative electric energy of the DC motor of the wire feeder is consumed on the brake resistor BRK1; the DC motor voltage feedback circuit samples the voltage of the DC motor of the wire feeder in real time. Because there is a certain corresponding relationship between the speed of the wire feeder DC motor and its voltage, the wire feed control chip compares the sampled feedback voltage with the set value, and after arithmetic processing, adjust the PWM output so that the wire feeding speed is finally maintained stable, and a closed-loop control is realized.

Compared with conventional multi-functional welding power sources, non-limiting embodiments or aspects of the present disclosure improve or optimize the design of the wire feeding control system around dual-pulse welding. For example, in the Chinese invention patent "DSC-based full digital SiC inverter multi-functional argon arc welding power source" (Publication No.: 106392262B), although the SiC power device is used to develop the welding power source, the improved or optimized development of the wire feeding control is not carried out for the dual-pulse MIG welding; non-limiting embodiments or aspects of the present disclosure adopt a H-bridge drive mode to realize a stepless speed regulation of the wire feeding and realize a forward rotation, a reverse rotation, a pulsation and other operating methods; making full use of CAN communication circuit to carry out a coordinated control of wire feeding and welding power source, a dual-pulse MIG welding may be realized through "a single pulse+pulse wire feeding" or "low frequency modulation+constant speed wire feeding".

Figure 5:
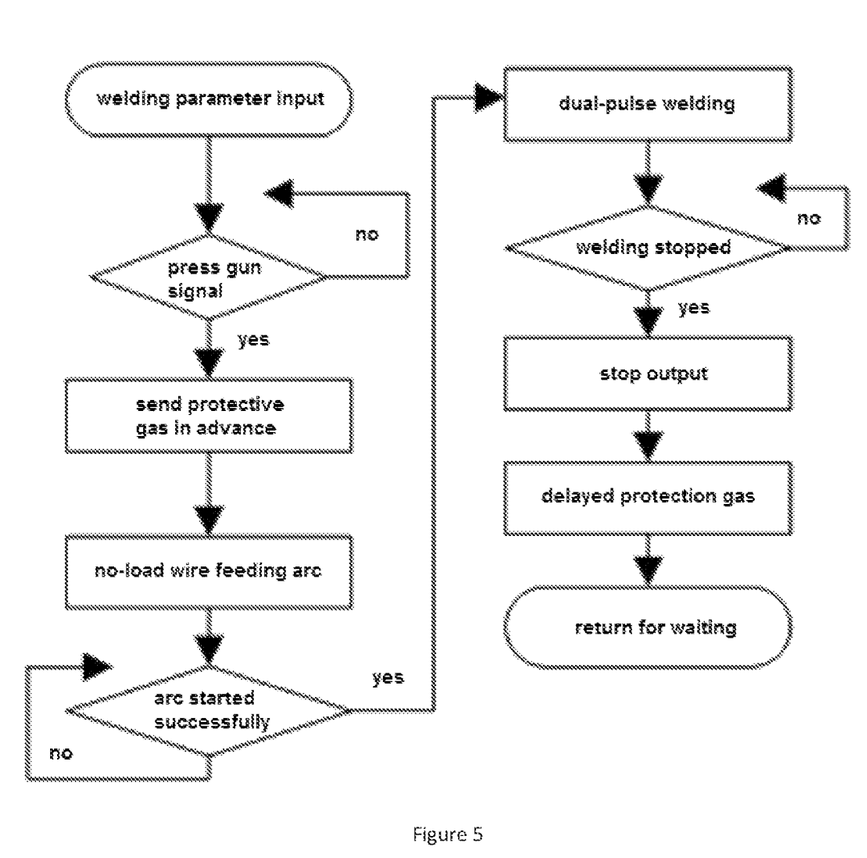
FIG. 5 is a dual-pulse MIG welding operating flow chart of non-limiting embodiments or aspects of a dual-pulse MIG welding power source based on SiC power devices.

A basic working principle of non-limiting embodiments or aspects of the present disclosure is: the input part of the main circuit is connected to a three-phase power supply, and the three-phase power frequency AC power is transformed into a smoother high voltage DC power after the power frequency rectifier filter module. The high-speed DSC core control module is based on the preset value of the digital human-machine interaction module and the difference in the feedback value of the load voltage and current detection feedback module, to generate a suitable PWM signal through a control algorithm calculation. After the signal is isolated and amplified by the SiC high-frequency drive module, it drives the first SiC high-frequency inverter module to convert the smooth high-voltage direct current into a high-frequency high-voltage alternating current square wave at an ultra-high frequency such as 200 kHz; the high-frequency high-voltage AC square wave is passed through the first high-frequency transformer to achieve electrical isolation, power transmission, and voltage conversion to the secondary to become a high-frequency low-voltage AC square wave; finally, a smooth low-voltage direct current output to the load is obtained through the first SiC fast full-wave rectification filter module. As shown in FIG. 5, under the control of the high-speed DSC core control module, the coordinated control of the welding power source and the wire feeder is realized through the CAN network of the wire feeding control module. The steps of the dual-pulse MIG welding are carried out in sequence to complete processes such as the air supply in advance, no-load wire feeding arc starting, dual-pulse welding output, arc closing, and delayed air supply protection etc.

Figure 6:
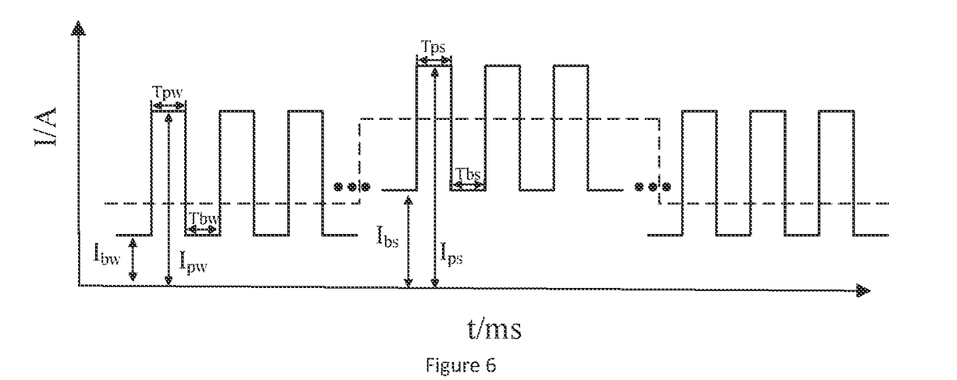
FIG. 6 is an illustrative diagram of non-limiting embodiments or aspects of a low-frequency modulation welding current waveform of a dual-pulse MIG welding power source based on SiC power devices

Methods for realizing dual-pulse MIG welding in non-limiting embodiments or aspects of the present disclosure include: a method in which the welding power source outputs a single pulse to cooperate with pulsating wire feeding of the wire feeder to perform dual-pulse welding; the other is that the welding power source outputs a low-frequency modulation waveform to cooperate with the wire feeder constant speed wire feeding to realize a dual-pulse welding. The specific operating principle is as follows: low frequency modulation+constant speed wire feeding: the welding power supply working mode is set to dual-pulse mode through the digital human-machine interaction module, and the speed of the constant speed wire feeding and the dual-pulse current waveform parameters are set. As shown in FIG. 6, the dual-pulse current waveform parameters comprise: strong pulse group peak value Ips, strong pulse group base value Ibs, strong pulse group peak time Tps, strong pulse group base value time Tbs, weak pulse group peak value Ipw, weak pulse group base value Ibw, weak pulse group peak time Tpw and weak pulse group base time Tbw; the wire feeding speed remains constant during welding, and the power output generates a dual-pulse waveform with overlapping strong and weak pulses; single pulse output+pulsating wire feeding: set the operating mode of the welding power supply to pulse mode through the digital panel, set the pulse current waveform parameters: peak value Ip, base value Ib, peak time tp and base time tb; set peak wire feeding speed Vp and base wire feeding Speed Vb; dual-pulse MIG welding conditions are formed by the combination of pulse current and pulsating wire feeding; the dual-pulse MIG welding power source of non-limiting embodiments or aspects of the present disclosure adopts a new type of SiC power switch transistor, the inverter frequency may be as high as 200 kHz, the dynamic performance is excellent, and the response time is extremely short. It may realize the refined control of energy so as to better match the pulsating wire feeding, and broaden the effective setting range of low-frequency modulation parameters, providing a platform for exploring new combinations of dual-pulse process parameters.

A preferred welding process of non-limiting embodiments or aspects of the present disclosure may be dual-pulse MIG welding. Simple software changes or parameter settings are performed on this hardware platform to adjust the output signal of the SiC high-frequency drive module, so processes such as constant current, constant pressure, and single pulse gas shielded welding may also be realized.

Figure 7:
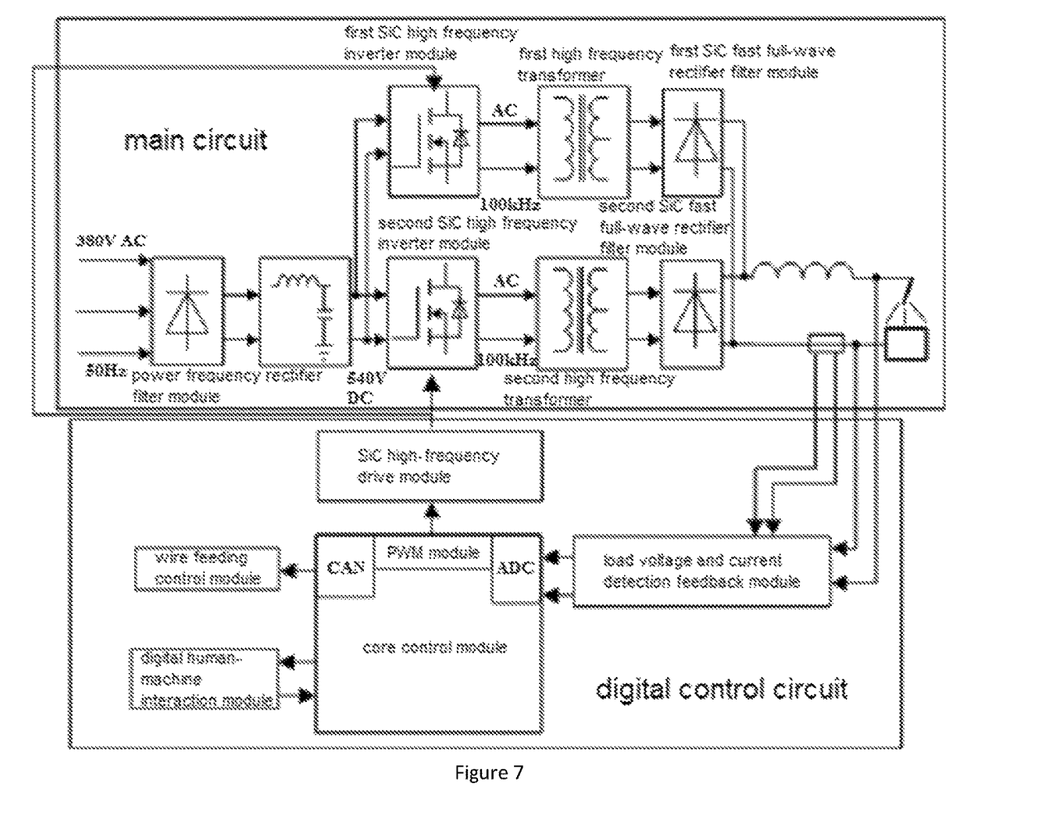
FIG. 7 is an illustrative diagram of non-limiting embodiments or aspects of another implementation of an overall framework of a dual-pulse MIG welding power source based on SiC power devices.
Figure 8:
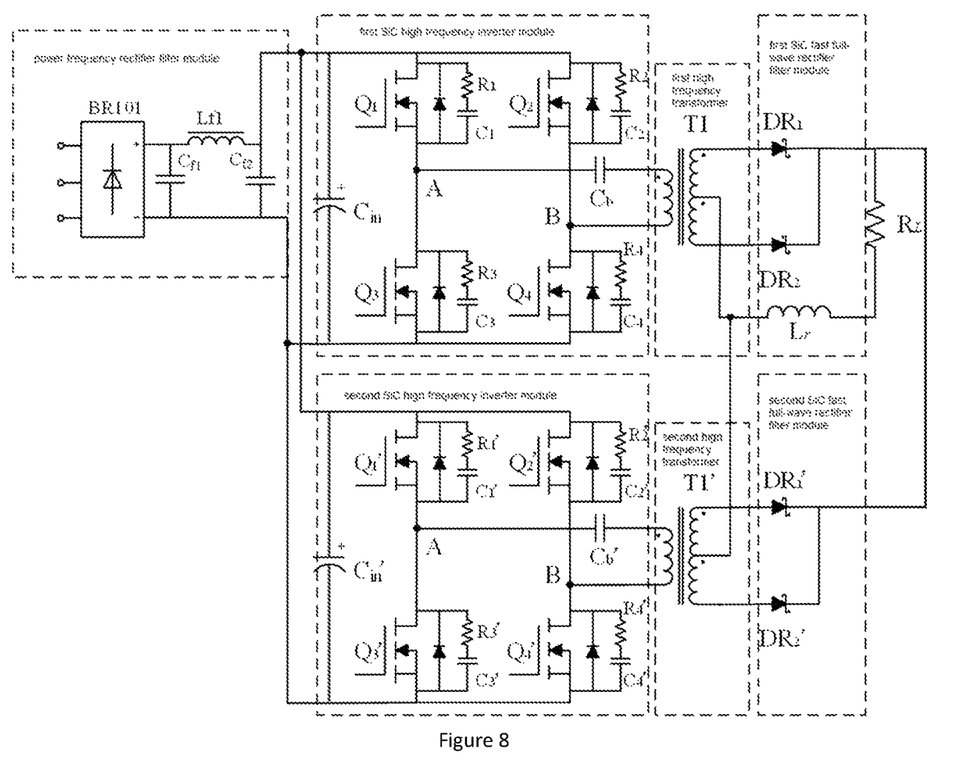
FIG. 8 is a circuit diagram of non-limiting embodiments or aspects of another implementation of a main circuit in the dual-pulse MIG welding power source based on SiC power devices.

Non-limiting embodiments or aspects of another implementation of a dual-pulse MIG welding power source based on SiC power devices is shown in FIGS. 7 and 8. A different from the dual-pulse MIG welding power source based on SiC power devices shown in FIGS. 1 and 6 may include: the main circuit further comprises a second SiC high frequency inverter module, a second high frequency transformer, and a second SiC fast full-wave rectifier filter module; wherein the second SiC high frequency inverter module is connected to the power frequency rectifier filter module, the second SiC fast full-wave rectifier filter module is connected with the load; another end of the SiC high frequency drive module is also connected with the second SiC high frequency inverter module; a topology of the second SiC high frequency inverter module is the same as that of the first SiC high frequency inverter module; a topology of the second high frequency transformer is the same as that of the first high frequency transformer; a topology of the second SiC fast full-wave rectifier filter module is the same as that of the first SiC fast full-wave rectifier filter module. The main circuit adopts a dual-loop parallel structure, which may further increase the output power, thereby ensuring sufficient margin. The rest of the structure of this implementation may be the same as or similar to the dual-pulse MIG welding power source based on SiC power devices shown in FIGS. 1 and 6.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

The invention claimed is:

1. A dual-pulse MIG welding power source based on SiC power devices, comprises:
   a main circuit and a digital control circuit;
   the main circuit comprises a power frequency rectifier filter module, a first SiC high frequency inverter module, a first high frequency transformer, and a first SiC fast full-wave rectifier filter module connected sequentially;
   wherein the power frequency rectifier filter module is connected to a three-phase AC power supply, and the first SiC fast full-wave rectifier filter module is connected to a load;
   the digital control circuit comprises a digital human-machine interaction module, a core control module, a SiC high-frequency drive module, a load voltage and current detection feedback module, and a wire feeding control module;
   wherein the digital human-machine interaction module is connected to the core control module;
   wherein one end of the SiC high-frequency drive module is connected to a pulse width modulation (PWM) output of the core control module, and another end of the SiC high-frequency drive module is connected to the first SiC high frequency inverter module;
   wherein one end of the load voltage and current detection feedback module is connected to the load, and another end of the load voltage and current detection feedback module is connected to an A/D conversion end of the core control module; and
   wherein one end of the wire feeding control module is connected to the core control module, and another end of the wire feeding control module is connected to a wire feeder DC motor, wherein the wire feeding control module comprises: a wire feeding control chip, a controller area network (CAN) communication circuit, an H-bridge drive circuit, and a DC motor voltage feedback circuit;
   wherein the wire feeding control chip is signally connected to the core control module through the CAN communication circuit to realize a communication between the wire feeding control chip and the core control module;
   wherein the wire feeding control chip is connected to the wire feeder DC motor through the H-bridge drive circuit to drive the wire feeder DC motor to operate;
   wherein the DC motor voltage feedback circuit is configured to detect a voltage of the wire feeder DC motor in real time; and
   wherein the DC motor voltage feedback circuit is connected with the wire feeding control chip to realize a closed loop control of the wire feeder DC motor.

2. The dual-pulse MIG welding power supply based on SiC power devices according to claim 1, wherein the first SiC high frequency inverter module comprises a SiC power switch transistor Q1, a SiC power switch transistor Q2, a SiC power switch transistor Q3, and a SiC power switch transistor Q4;
   wherein the SiC power switch transistor Q1, the SiC power switch transistor Q2, the SiC power switch transistor Q3, and the SiC power switch transistor Q4 are respectively connected in parallel with a first RC absorption circuit;
   wherein the SiC power switch transistor Q1, the SiC power switch transistor Q2, the SiC power switch transistor Q3 and the SiC power switch transistor Q4 form a full-bridge inverter circuit, and the full-bridge inverter circuit is connected to a primary of the first high frequency transformer through a blocking capacitor $C_b$;
   wherein the first SiC fast full-wave rectifier filter module comprises a SiC Schottky diode group DR1 and a SiC Schottky diode group DR2;
   wherein a first secondary output terminal of the first high frequency transformer is connected to a third secondary output terminal of the first high frequency transformer through the SiC Schottky diode group DR1 and the SiC Schottky diode group DR2 connected sequentially; and
   wherein a connection point between the SiC Schottky diode group DR1 and the SiC Schottky diode group DR2 is connected to one end of the load, and a second secondary output terminal of the first high frequency transformer is connected to another end of the load through an output filter reactance Lr.

3. The dual-pulse MIG welding power supply based on SiC power devices according to claim 2, wherein the SiC Schottky diode group DR1 and the SiC Schottky diode group DR2 each include three SiC Schottky diodes and a second RC absorption circuit connected in parallel.

4. The dual-pulse MIG welding power supply based on SiC power devices according to claim 2, wherein the main circuit further comprises a second SiC high frequency inverter module, a second high frequency transformer, and a second SiC fast full-wave rectifier filter module;
   wherein the second SiC high frequency inverter module is connected to the power frequency rectifier filter module, and the second SiC fast full-wave rectifier filter module is connected with the load;
   wherein another end of the SiC high frequency drive module is connected with the second SiC high frequency inverter module;
   wherein a topology of the second SiC high frequency inverter module is a same topology as that of the first SiC high frequency inverter module;
   wherein a topology of the second high frequency transformer is a same topology as that of the first high frequency transformer; and
   wherein a topology of the second SiC fast full-wave rectifier filter module is a same topology as that of the first SiC fast full-wave rectifier filter module.

5. The dual-pulse MIG welding power supply based on SiC power devices according to claim 2, wherein the core control module includes a high-speed DSC core control module.

6. The dual-pulse MIG welding power supply based on SiC power devices according to claim 1, wherein the H-bridge drive circuit comprises a switching transistor Qf1, a switching transistor Qf2, a switching transistor Qf3, a switching transistor Qf4, a braking resistor BRK1, and a relay JD1;

wherein the switching transistor Qf1, the switching transistor Qf2, the switching transistor Qf3, and the switching transistor Qf4 form an H-bridge topology;

wherein an output end of the H-bridge topology is connected to the wire feeder DC motor; and  wherein the braking resistor BRK1 and the relay JD1 are connected in series, and the braking resistor BRK1 and the relay JD1 that are connected in series are connected in parallel to the output of the H-bridge topology.

\* \* \* \* \*